United States Patent
Zhang et al.

(10) Patent No.: US 12,528,719 B2
(45) Date of Patent: Jan. 20, 2026

(54) BIOMASS/IRON-BASED ORGANIC FRAMEWORK COMPOSITE AND PREPARATION METHOD AND USE THEREOF

(71) Applicant: Jiangsu Provincial Academy of Environmental Science, Nanjing (CN)

(72) Inventors: Yanhong Zhang, Nanjing (CN); Tianhao Gao, Nanjing (CN); Guangbing Liu, Nanjing (CN); Lu Zhang, Nanjing (CN); Hancheng Cao, Nanjing (CN); Weijing Liu, Nanjing (CN)

(73) Assignee: JIANGSU PROVINCIAL ACADEMY OF ENVIRONMENTAL SCIENCE, Nanjing (CN)

( * ) Notice: Subject to any disclaimer, the term of this patent is extended or adjusted under 35 U.S.C. 154(b) by 0 days.

(21) Appl. No.: 19/226,193

(22) Filed: Jun. 3, 2025

(65) Prior Publication Data

US 2025/0296857 A1   Sep. 25, 2025

Related U.S. Application Data

(63) Continuation of application No. PCT/CN2024/136583, filed on Dec. 4, 2024.

(30) Foreign Application Priority Data

Mar. 20, 2024  (CN) .......................... 202410321388.9

(51) Int. Cl.
*C02F 1/28*   (2023.01)
*B01J 20/22*   (2006.01)
(Continued)

(52) U.S. Cl.
CPC ............. *C02F 1/288* (2013.01); *B01J 20/226* (2013.01); *B01J 20/28047* (2013.01);
(Continued)

(58) Field of Classification Search
CPC .......... C02F 1/288; C02F 1/281; C02F 1/286; C02F 2101/105; B01J 20/226;
(Continued)

(56) References Cited

FOREIGN PATENT DOCUMENTS

| CN | 110102267 A | 8/2019 |
|---|---|---|
| CN | 114672064 A | 6/2022 |

OTHER PUBLICATIONS

Gibbons, M.K. and Gagnon, G.A., 2011. Understanding removal of phosphate or arsenate onto water treatment residual solids. Journal of Hazardous Materials, 186(2-3), pp. 1916-1923 (Year: 2011).*

(Continued)

*Primary Examiner* — Magali P Slawski
*Assistant Examiner* — Bernadette Karen McGann
(74) *Attorney, Agent, or Firm* — Bayramoglu Law Offices LLC

(57) ABSTRACT

A biomass/iron-based organic framework composite and a preparation method and use thereof are provided. The preparation method includes: adding chitosan, an iron-based organic framework MIL-88(B), and a crosslinking agent to an acetic acid solution, thoroughly mixing, and heating in a water bath; and adding a mixed solution dropwise, and allowing a reaction to produce the biomass/iron-based organic framework composite. The biomass/iron-based organic framework composite prepared by the present disclosure has a phosphate adsorption capacity of 1.1 mmol/g, which is higher than the corresponding adsorption capacities of a pure iron-based organic framework material and a pure biomass-based material. Under the optimal adsorption pH (Continued)

condition, a loss of an iron-based organic framework material is less than 1%.

4 Claims, 7 Drawing Sheets

(51) Int. Cl.
B01J 20/28 (2006.01)
B01J 20/30 (2006.01)
C02F 101/10 (2006.01)
C07F 15/02 (2006.01)

(52) U.S. Cl.
CPC ....... *B01J 20/3071* (2013.01); *B01J 20/3078* (2013.01); *B01J 20/3085* (2013.01); *C07F 15/025* (2013.01); *C02F 1/281* (2013.01); *C02F 1/286* (2013.01); *C02F 2101/105* (2013.01)

(58) Field of Classification Search
CPC .............. B01J 20/28047; B01J 20/3071; B01J 20/3078; B01J 20/3085; C07F 15/025
See application file for complete search history.

(56) References Cited

OTHER PUBLICATIONS

Rizk, M.A., Alsaiari, R.A., Shahat, A., Alsaiari, M.A., Elshaarawy, R.F. and Taha, A.S., 2023. Effective removal of arsenic from aqueous effluents via structural tailoring of iron-based Mof (MIL-88 (Fe)) using ionic Schiff base. Journal of Molecular Liquids, 390, p. 123086 (Year: 2023).*

Zhang, S., Ding, J. and Tian, D., 2022. Incorporation of MIL-101 (Fe or Al) into chitosan hydrogel adsorbent for phosphate removal: Performance and mechanism. Journal of Solid State Chemistry, 306, p. 122709 (Year: 2022).*

GB/T 11893-1989, Water quality-Determination of total phosphorus-Ammonium molybdate spectrophotometric method, China National Standards, 1990, pp. 1-4, State Bureau of Technical Supervision.

GB/T 11911-1989, Water quality-Determination of iron and manganese-Flame atomic absorption spectrometric method, China National Standards, 1990, pp. 1-3, State Bureau of Technical Supervision.

Shaopeng Zhang, et al., Incorporation of MIL-101 (Fe or Al) into chitosan hydrogel adsorbent for phosphate removal: Performance and mechanism, Journal of Solid State Chemistry, 2022, pp. 1-9, vol. 306, No. 122709.

* cited by examiner

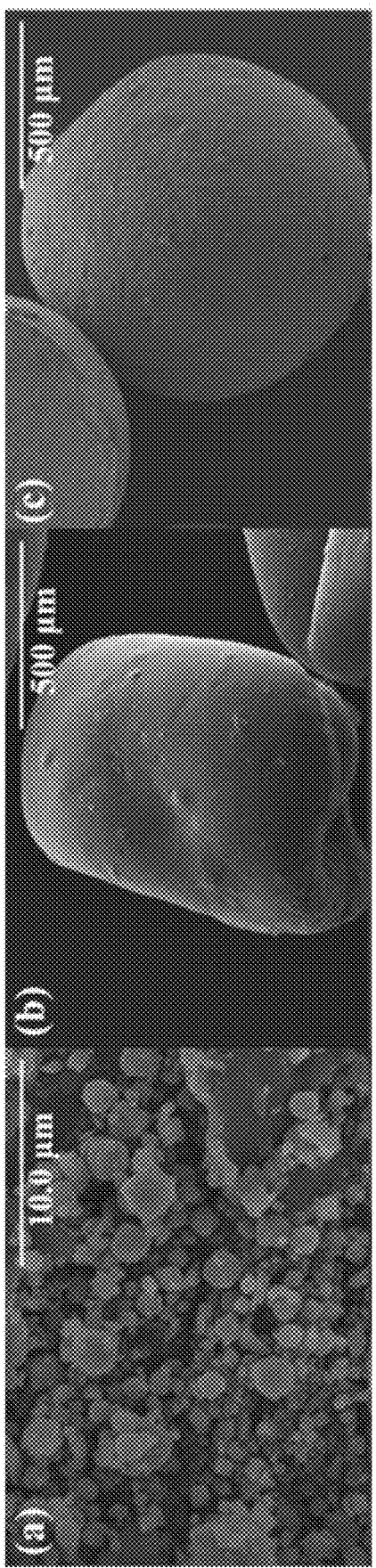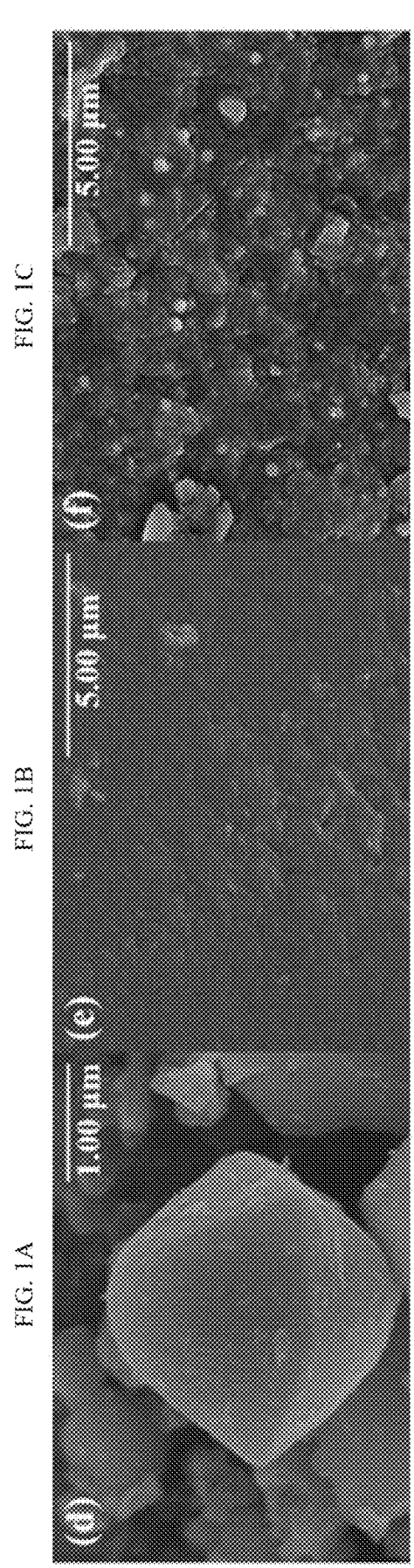
FIG. 1A  FIG. 1B  FIG. 1C  FIG. 1D  FIG. 1E  FIG. 1F

BIOMASS/IRON-BASED ORGANIC FRAMEWORK COMPOSITE AND PREPARATION METHOD AND USE THEREOF

CROSS REFERENCE TO THE RELATED APPLICATIONS

This application is a continuation application of International Application No. PCT/CN2024/136583, filed on Dec. 4, 2024, which is based upon and claims priority to Chinese Patent Application No. 202410321388.9, filed on Mar. 20, 2024, the entire contents of which are incorporated herein by reference.

TECHNICAL FIELD

The present disclosure belongs to the technical field of preparation and use of environmental materials, and in particular relates to a biomass/iron-based organic framework composite and a preparation method and use thereof.

BACKGROUND

Phosphorus, one of the major elements contributing to water eutrophication, can accelerate the growth of phytoplankton and lead to the depletion of oxygen and the death of fish and aquatic organisms. Electroplating is an indispensable basic industry for human industry and life. However, due to the discharge of a large amount of phosphorus-containing polluted wastewater in the electroplating process, the electroplating industry has become one of the most dangerous chemically intensive industries worldwide. A variety of phosphorus-containing agents, such as phosphoric acid, complexing agents, and reducing agents, are adopted in the electroplating production process, resulting in a lot of phosphorus-containing wastewater.

The treatment methods for inorganic phosphorus-containing wastewater are mainly chemical and physical methods, such as ion exchange, membrane separation, and adsorption processes. The ion exchange process exhibits insufficient selectivity for phosphorus and poor anti-interference performance in complex aquatic environments. The membrane separation process shows high selectivity for pollutants, but requires the frequent replacement of membrane modules. In contrast, the adsorption process involves a low preparation cost and few procedures, is suitable for the enrichment and recovery of low-concentration phosphorus based on solid functional groups, and has advantages such as simplicity, cost-effectiveness, and low carbon emission.

Domestic and international studies have shown that iron-based organic frameworks are a class of novel porous coordination polymers produced through the coordination-driven assembly of iron with organic ligands and have unique structures, large specific surface areas, and uniform, controllable, and diverse pore structures. Iron-based organic frameworks have been widely used in the field of adsorption and have presented a strong ability to absorb phosphorus and resist interference. Despite the excellent phosphorus-absorbing performance, the use of fine particles in wastewater treatment may lead to the loss of elements and the poor recovery and recycling after the treatment, resulting in high operating costs. Therefore, the development of appropriate supports to stabilize adsorbents is critically important to facilitate the recycling and recovery of spent adsorbents.

The Chinese patent CN202210404779.8 discloses a preparation method and use of an MIL-100(Fe)/cellulose porous composite microsphere. In this patent, an iron-based organic framework is added to a cellulose solution, followed by fully stirring and adding it to a metal ion solution for soaking to produce a composite microsphere hydrogel, which has advantages such as excellent mechanical properties, high porosity, and superior adsorption efficiency. However, during preparation, the method does not accurately control whether there is a potential leakage risk of the iron-based organic framework.

According to search results, there is no relevant patent or published literature regarding phosphate adsorption with biomass/iron-based organic framework composites. Therefore, there is an urgent need to develop a method that can effectively mitigate the loss of an iron-based organic framework and make an iron-based organic framework-loaded material maintain a high adsorption capacity during a continuous operation, thereby meeting the practical application requirements.

SUMMARY

In view of the above-mentioned problems in the prior art, a technical problem to be solved by the present disclosure is to provide a preparation method of a biomass/iron-based organic framework composite. The preparation method has advantages such as simple preparation process flow and easy industrial production. Another technical problem to be solved by the present disclosure is to provide a biomass/iron-based organic framework composite prepared by the above preparation method. The abundant functional groups in a biomass have an electrostatic attraction effect for phosphates, which enhances the ability of an iron-based organic framework material to adsorb and remove phosphates. Another technical problem to be solved by the present disclosure is to provide a use of the biomass/iron-based organic framework composite as an adsorbent in adsorption of phosphate pollutants in water.

To solve the above technical problems, the present disclosure adopts the following technical solutions:

A preparation method of a biomass/iron-based organic framework composite is provided, including: adding chitosan, an iron-based organic framework MIL-88(B), and a crosslinking agent to an acetic acid solution, thoroughly mixing, and heating in a water bath; and adding a mixed solution dropwise, and allowing a reaction to produce the biomass/iron-based organic framework composite.

Preferably, a g/g/mL ratio of the chitosan, the iron-based organic framework MIL-88(B), and the crosslinking agent is 0.6:1:0.154.

Preferably, the crosslinking agent is epichlorohydrin.

Preferably, the mixed solution is a mixed solution of sodium hydroxide, sodium sulfate, absolute ethanol, and water, and a g/g/mL/mL ratio of the sodium hydroxide, the sodium sulfate, the absolute ethanol, and the water is 16:12:2:300.

The preparation method of a biomass/iron-based organic framework composite specifically includes the following steps:

1) weighing and adding the chitosan, the iron-based organic framework MIL-88(B), and the crosslinking agent to the acetic acid solution, thoroughly mixing, and heating in a 60° C. water bath to allow crosslinking for 2 h to produce a mixed material;
2) adding a mixed solution of sodium hydroxide, sodium sulfate, absolute ethanol, and water dropwise to the mixed material obtained in the step 1) to produce hydrogel beads; and 3) placing the hydrogel beads in a diluted crosslinking agent to enhance a mechanical strength, washing, and drying at room temperature to produce the biomass/iron-based organic framework composite.

A biomass/iron-based organic framework composite prepared by the preparation method of a biomass/iron-based organic framework composite is provided.

A use of the biomass/iron-based organic framework composite as an adsorbent in adsorption of phosphate pollutants in water is provided.

For the use, an adsorption process is as follows: adding the biomass/iron-based organic framework composite to phosphate-containing water, and shaking at room temperature to allow adsorption of phosphates.

For the use, the adsorption of phosphates lasts for 24 h, and a concentration of adsorbable phosphates is 0.2 mg/L to 1.0 mg/L.

For the use, a biomass/iron-based organic framework composite undergoing the adsorption is fully shaken in 100 mL of a mixed solution at 150 r/min to allow elution for 12 h, and then reused for the adsorption; and the mixed solution is a mixed solution including 0.1 mol/L of sodium hydroxide and 5 mol/L of sodium nitrate.

Compared with the prior art, the present disclosure has the following beneficial effects:
(1) The abundant functional groups in the biomass adopted by the present disclosure have an electrostatic attraction effect for phosphates, which enhances the ability of the iron-based organic framework material to adsorb and remove phosphates during practical applications.
(2) The biomass/iron-based organic framework composite prepared by the present disclosure has a phosphate adsorption capacity of 1.1 mmol/g, which is higher than the corresponding adsorption capacities of a pure iron-based organic framework material and a pure biomass-based material. Under the optimal adsorption pH condition, a loss of an iron-based organic framework material is less than 1%.
(3) The regeneration of the biomass/iron-based organic framework composite of the present disclosure can be easily implemented with simple operations, which reduces the treatment cost of wastewater. After 6 adsorption-regeneration cycles, the biomass/iron-based organic framework composite can still exhibit an adsorption efficiency of higher than 80%, indicating a stable regeneration efficiency.

BRIEF DESCRIPTION OF THE DRAWINGS

FIGS. 1A-1F show scanning electron microscopy (SEM) images of MIL-88(B), chitosan, and MIL-88(B)/chitosan, where (FIG. 1A) and (FIG. 1D) show the MIL-88(B) at 10.0 µm and 1.00 µm, respectively; (FIG. 1B) and (FIG. 1E) show the chitosan at 500 µm and 5.00 µm, respectively; and (FIG. 1C) and (FIG. 1F) show the MIL-88(B)/chitosan at 500 µm and 5.00 µm, respectively;

DETAILED DESCRIPTION OF THE EMBODIMENTS

The present disclosure is further elucidated below in conjunction with specific embodiments, and the embodiments are implemented under the premise of the technical solutions of the present disclosure. It should be understood that these embodiments are provided merely to illustrate the present disclosure rather than to limit the scope of the present disclosure. Unless otherwise specified in the following embodiments, the technical means adopted all are conventional means well known to those skilled in the art. If no specific conditions are specified in the embodiments, the embodiments will be implemented under conventional conditions or the conditions recommended by a manufacturer. All of the used reagents or instruments which are not specified with manufacturers are conventional commercially-available products.

The performance testing methods adopted by the present disclosure are as follows:
1. A test method for the phosphate adsorption and desorption performance is as follows: ammonium molybdate spectrophotometry (GB/T 11893-1989).
2. A test method for an iron-based organic framework loss is as follows: flame atomic absorption spectrophotometry (GB/T 11911-1989).

Example 1

1 g of a powder MIL-88(B), 0.6 g of chitosan, and 0.154 mL of epichlorohydrin were added to 20 mL of a 2% (V/V) acetic acid solution, and crosslinking was conducted at 60° C. for 2 h. 300 mL of a mixed solution including 16 g of sodium hydroxide, 12 g of sodium sulfate, and 2 mL of absolute ethanol was added dropwise through a syringe, and full crosslinking was conducted to produce hydrogel beads. Crosslinking was conducted for 2 h in 100 mL of distilled water including 0.5 mL of epichlorohydrin to enhance a mechanical strength. Washing was conducted, and then drying was conducted at room temperature to produce 6 g of an MIL-88(B)/chitosan hydrogel, namely, a biomass/iron-based organic framework composite.

Figure 2:
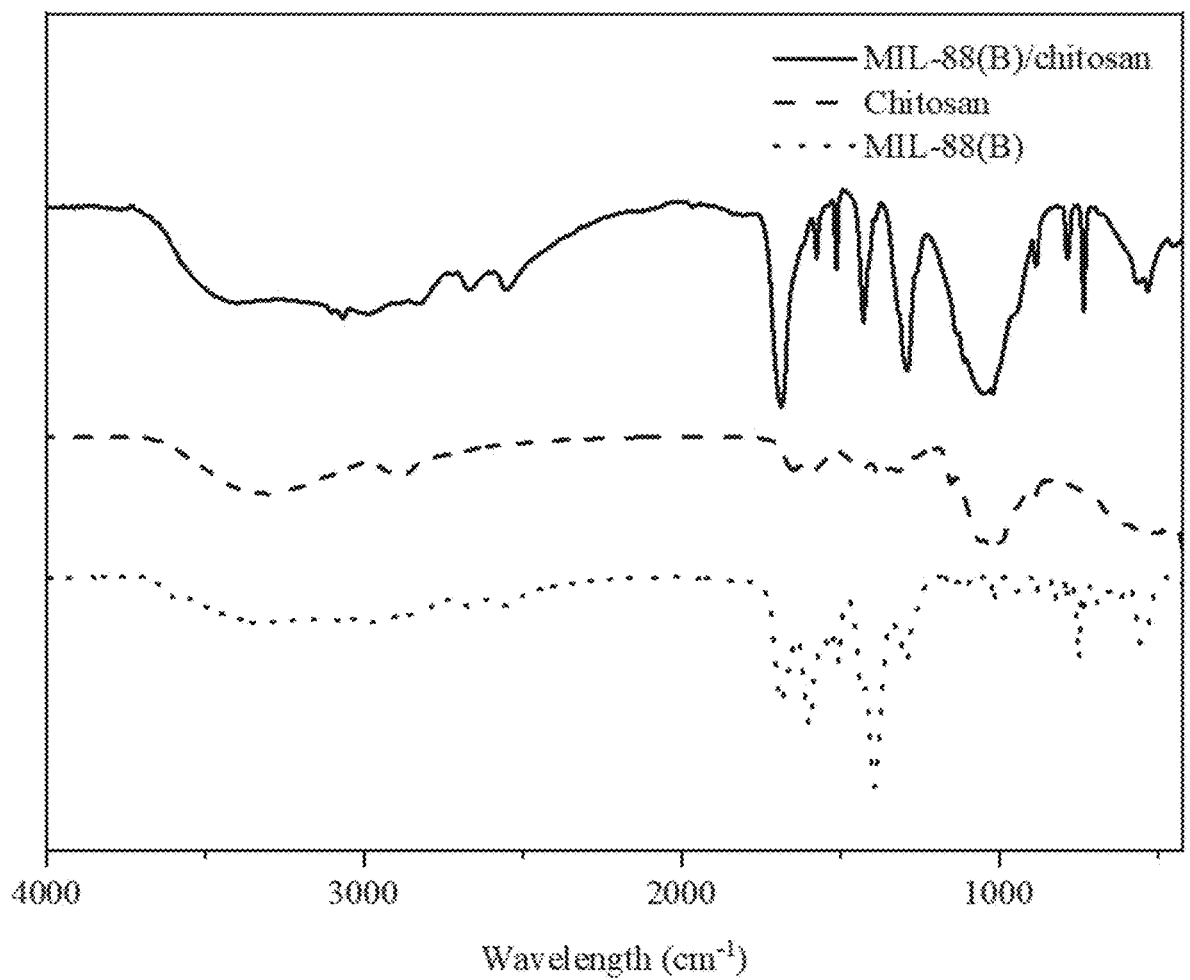
FIG. 2 shows Fourier transform infrared spectroscopy (FTIR) spectra of MIL-88(B), chitosan, and MIL-88(B)/chitosan.
Figure 3:
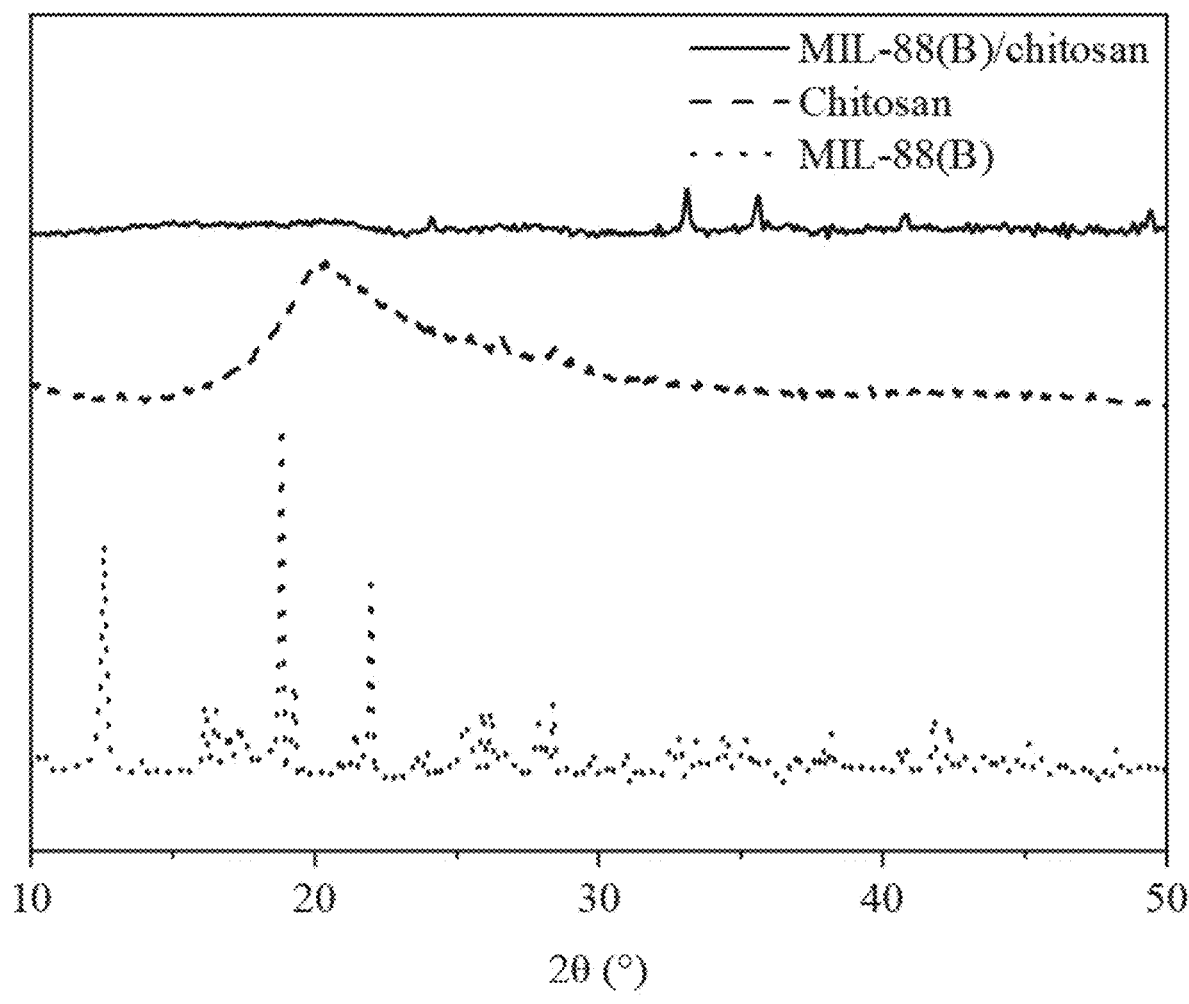
FIG. 3 shows X-ray diffraction (XRD) patterns of MIL-88(B), chitosan, and MIL-88(B)/chitosan.

It can be seen from the SEM images and XRD patterns of FIGS. 1A-1F and FIG. 3 that there are many large pores on a surface of the MIL-88(B)/chitosan hydrogel prepared by the present disclosure. It can be found through further magnification that these pores carry many small pores, and MIL-88(B) maintains the same size and ordered shape. The presence of iron indicates the introduction of MIL-88(B), and the increase of N indicates the appearance of chitosan. It can be seen from the FTIR spectra in FIG. 2 that there is a peak at 1,650 cm$^{-1}$ corresponding to an extended vibration of a C—N bond caused by chitosan crosslinking, and there is a strong peak around 3,354 cm$^{-1}$ related to a propagation vibration of N—H, which can be attributed to the protonation of amino.

Comparative Example 1

4.32 g of ferric chloride hexahydrate and 2.66 g of terephthalic acid were added to 100 mL of N,N-dimethylformamide, complete dissolution was conducted, and incubation was conducted in an autoclave at 150° C. for 12 h. Washing was conducted several times with deionized water and methanol alternately. Drying was conducted to produce 2.51 g of a pure iron-based organic framework material MIL-88(B).

Comparative Example 2

0.6 g of chitosan and 0.154 mL of epichlorohydrin were added to 20 mL of a 2% (V/V) acetic acid solution, and crosslinking was conducted at 60° C. for 2 h. 300 mL of a mixed solution including 16 g of sodium hydroxide, 12 g of sodium sulfate, and 2 mL of absolute ethanol was added dropwise through a syringe, and full crosslinking was conducted to produce hydrogel beads. Crosslinking was conducted for 2 h in 100 mL of distilled water including 0.5 mL of epichlorohydrin to enhance a mechanical strength. Washing was conducted, and then drying was conducted at room temperature to produce 5.0 g of a pure biomass-based material chitosan alone.

Example 2

The MIL-88(B)/chitosan hydrogel prepared in Example 1, the MIL-88(B) prepared in Comparative Example 1, and the chitosan prepared in Comparative Example 2 each were tested for phosphate adsorption performance.

Monosodium phosphate solutions with concentrations of 0.5 mmol/L, 1 mmol/L, 2 mmol/L, 4 mmol/L, and 8 mmol/L were prepared with each in 50 mL, and a pH was adjusted to 7.0. 0.5 g of an adsorbent to be tested was added, and shaking was conducted at 25° C. for 24 h. A phosphate concentration in a solution was determined by ammonium molybdate spectrophotometry (GB/T 11893-1989). Results were shown in Table 1.

TABLE 1

Maximum adsorption capacities of MIL-88(B), chitosan, and MIL-88(B)/chitosan

| Adsorbent | Adsorption condition (° C.) | Maximum adsorption capacity (mmol/g) |
|---|---|---|
| MIL-88(B)/chitosan | 15 | 1.02 |
| | 25 | 1.10 |
| | 35 | 1.12 |
| MIL-88(B) | 25 | 1.07 |
| Chitosan | 25 | 0.40 |

It can be seen from Table 1 that a maximum adsorption capacity of MIL-88(B)/chitosan at room temperature is 1.10 mmol/g, which is better than maximum adsorption capacities of the pure iron-based organic framework material MIL-88(B) and the pure biomass-based material chitosan.

Figure 4:
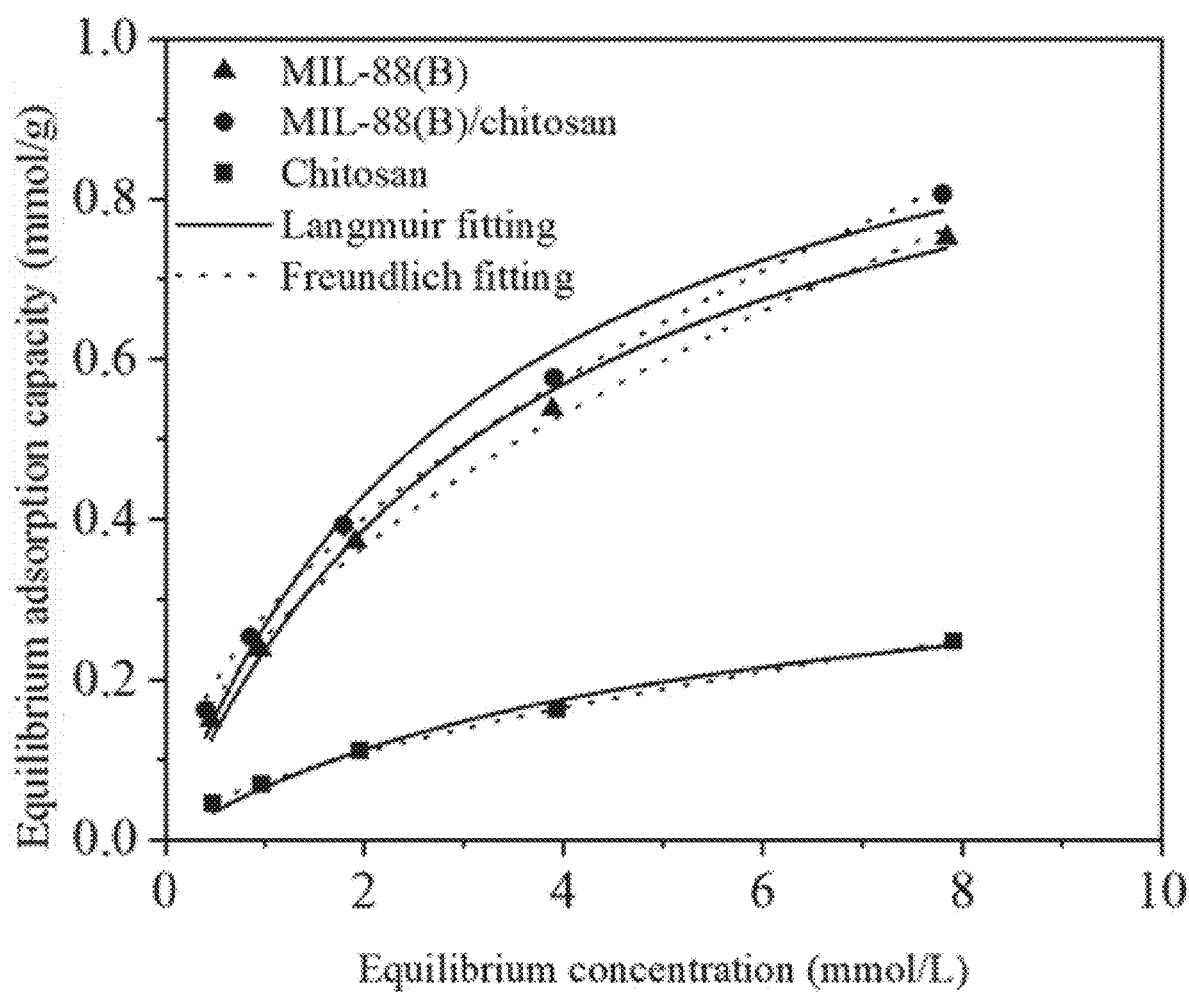
FIG. 4 shows removal effects of MIL-88(B), chitosan, and MIL-88(B)/chitosan for phosphates at different concentrations.

As shown in FIG. 4, a phosphate adsorption process of the MIL-88(B)/chitosan hydrogel is more consistent with the Freundlich isotherm than the Langmuir isotherm, indicating that MIL-88(B)/chitosan performs multilayer adsorption on a heterogeneous surface to remove phosphates.

Example 3

The MIL-88(B)/chitosan hydrogel prepared in Example 1, the MIL-88(B) prepared in Comparative Example 1, and the chitosan prepared in Comparative Example 2 each were tested for phosphate adsorption performance under different pH conditions.

Figure 5:
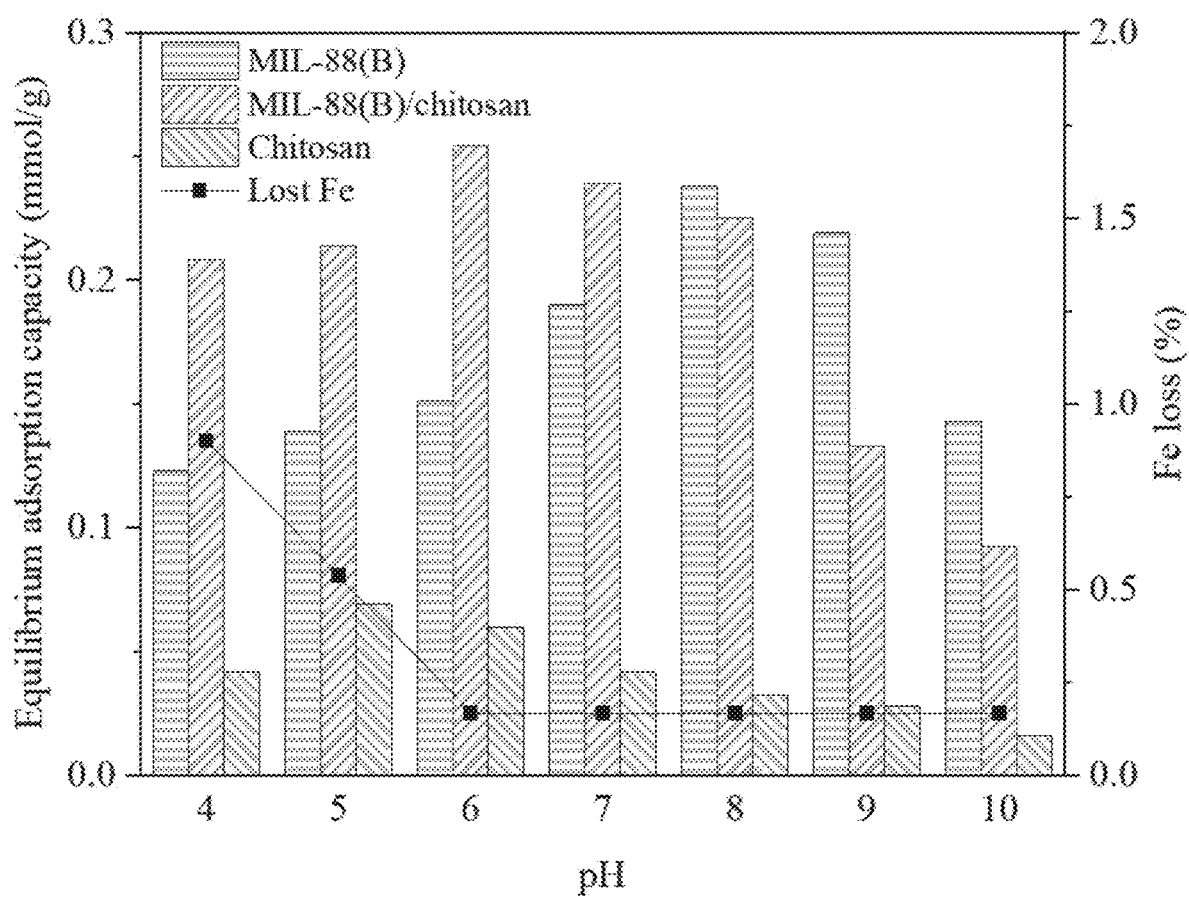
FIG. 5 shows adsorption performance and iron-based organic framework losses of MIL-88(B), chitosan, and MIL-88(B)/chitosan at different pH values.

Monosodium phosphate solutions with a concentration of 1 mmol/L were prepared with each in 50 mL, and pH values of the solutions were adjusted with sodium hydroxide and hydrochloric acid to 4.0, 5.0, 6.0, 7.0, 8.0, 9.0, and 10.0, respectively. 0.5 g of the MIL-88(B)/chitosan hydrogel prepared in Example 1 was added, and shaking was conducted at room temperature for 24 h. A phosphate concentration in a solution was determined by ammonium molybdate spectrophotometry (GB/T 11893-1989). Results were shown in FIG. 5. Phosphate adsorption efficiencies of the MIL-88(B)/chitosan were higher than 80% at a pH of 4 to 8, an appropriate pH range was 6 to 8, and there was a maximum adsorption capacity at a pH of 7, indicating that the MIL-88(B)/chitosan can adapt to a wide pH range.

The MIL-88(B)/chitosan hydrogel prepared in Example 1 was tested for an iron-based organic framework loss. Monosodium phosphate solutions that each were at a concentration of 1 mmol/L and had pH values of 4, 5, 6, 7, 8, 9, and 10, respectively. 0.5 g of the MIL-88(B)/chitosan hydrogel prepared in Example 1 was added, and shaking was conducted at room temperature for 24 h. An iron ion concentration in a solution was determined by flame atomic absorption spectrophotometry (GB/T 11911-1989). Results were shown in FIG. 5. An iron loss was always less than 1%, and the iron loss near the optimal pH of 6 to 8 was less than 0.2%, indicating that the biomass is conducive to reducing the loss and leakage of the iron-based organic framework material.

Example 4

The MIL-88(B)/chitosan hydrogel prepared in Example 1 was subjected to adsorption in electroplating tail water with an initial phosphate concentration of 0.85 mg/L and then to desorption, and then recycled.

Figure 6:
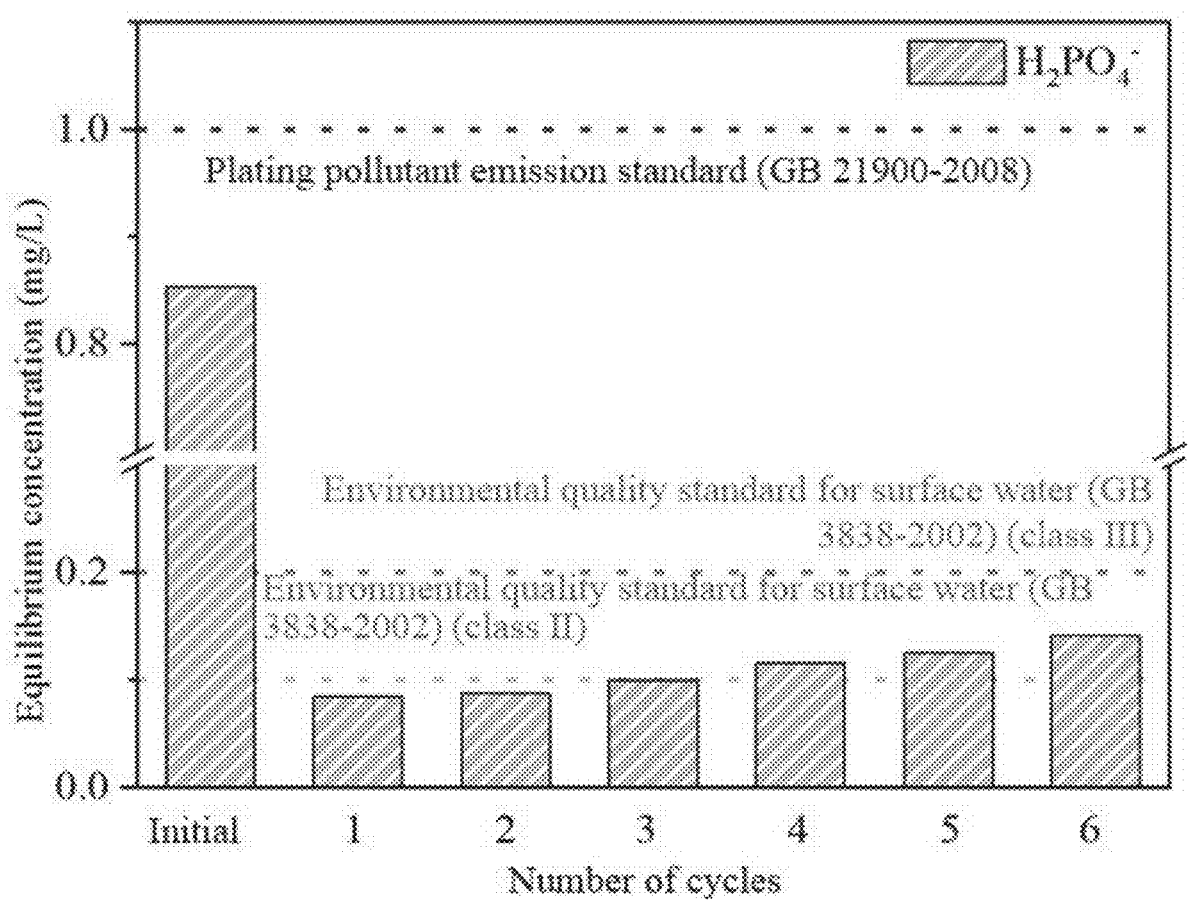
FIG. 6 shows a cyclic adsorption-desorption effect of MIL-88(B)/chitosan for electroplating tail water with an initial phosphate concentration of 0.85 mg/L.

0.5 g of the MIL-88(B)/chitosan hydrogel prepared in Example 1 was added to 50 mL of the wastewater, and shaking was conducted at room temperature for 24 h. 100 mL of a mixed solution including 5 mol/L of sodium nitrate and 0.1 mol/L of sodium hydroxide was prepared as an eluent, 0.5 g of MIL-88(B)/chitosan hydrogel beads with phosphates adsorbed was added, and shaking was conducted at room temperature for 12 h to produce a desorbed MIL-88(B)/chitosan hydrogel. Six adsorption-desorption cycles were implemented. Phosphate concentrations in each effluent and eluate were determined by ammonium molybdate spectrophotometry (GB/T 11893-1989). Results were shown in FIG. 6 and Table 2. After the 6 cycles, a phosphate concentration in the electroplating tail water was always lower than 0.2 mg/L, an adsorption efficiency was stably higher than 80%, and a recovery and regeneration efficiency was not less than 97%, indicating that the desorption method is stable and efficient.

TABLE 2

Adsorption efficiencies and desorption efficiencies during the cyclic adsorption-desorption of MIL-88(B)/chitosan for electroplating tail water with an initial phosphate concentration of 0.85 mg/L

| Number of cycles | Adsorption efficiency (%) | Desorption efficiency (%) |
|---|---|---|
| 1 | 90.16 | — |
| 2 | 89.70 | 99.48 |
| 3 | 88.29 | 98.43 |

TABLE 2-continued

Adsorption efficiencies and desorption efficiencies
during the cyclic adsorption-desorption of MIL-88(B)/chitosan
for electroplating tail water with an initial
phosphate concentration of 0.85 mg/L

| Number of cycles | Adsorption efficiency (%) | Desorption efficiency (%) |
|---|---|---|
| 4 | 86.42 | 97.88 |
| 5 | 85.36 | 98.78 |
| 6 | 83.49 | 97.81 |

Example 5

The MIL-88(B)/chitosan hydrogel prepared in Example 1, the MIL-88(B) prepared in Comparative Example 1, and the chitosan prepared in Comparative Example 2 each were tested for phosphate adsorption effects under different adsorption times.

Figure 7:
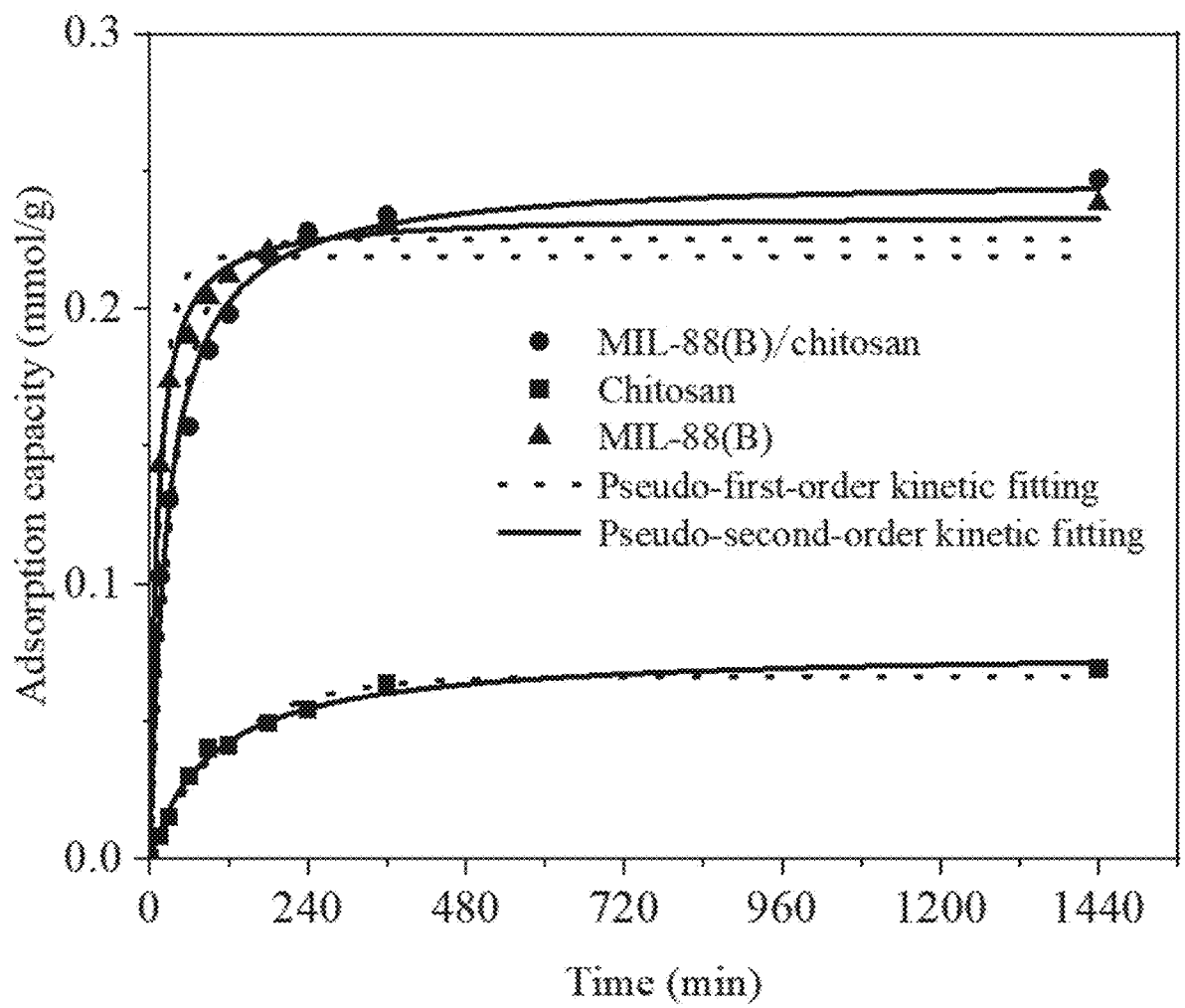
FIG. 7 shows adsorption effects of MIL-88(B), chitosan, and MIL-88(B)/chitosan hydrogels for phosphates under different adsorption times.

200 mL of a monosodium phosphate solution with a concentration of 1 mmol/L was prepared, and a pH was adjusted to 7.0. 0.5 g of an adsorbent to be tested was added. At 0 min, 15 min, 30 min, 60 min, 90 min, 120 min, 180 min, 240 min, 360 min, and 1,440 min, a sample was collected and tested for a phosphate concentration by ammonium molybdate spectrophotometry (GB/T 11893-1989). Results were shown in FIG. 7. The pseudo-second-order kinetic model is more suitable for a phosphate adsorption process of the MIL-88(B)/chitosan hydrogel prepared in the present disclosure than the pseudo-first-order kinetic model. The MIL-88(B)/chitosan hydrogel prepared by the present disclosure inherits the high phosphate adsorption efficiency of the pure iron-based organic framework MIL-88(B), and allows more than 90% of phosphates in a solution to be adsorbed with merely 180 min. The adsorption efficiency of the MIL-88(B)/chitosan hydrogel is not greatly affected by a low phosphate adsorption rate of the pure biomass chitosan. It is proved that the MIL-88(B)/chitosan has a high phosphate adsorption rate and a high adsorption efficiency.

The above are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A method of removing phosphate pollutants from water, the method comprising:
   (a) preparing a biomass/iron-based organic framework composite as an adsorbent by
      1) Weighing and adding chitosan, iron-based organic framework MIL-88 (B), and a crosslinking agent to an acetic acid solution, thoroughly mixing, and heating in a 60° C. water bath to allow the crosslinking for 2 h to produce a mixed material;
      2) Adding, dropwise, a first mixed solution of sodium hydroxide, sodium sulfate, absolute ethanol, and water dropwise to the mixed material produced in the step 1) to produce hydrogel beads; and
      3) Placing the hydrogel beads in a diluted crosslinking agent to enhance mechanical strength, washing, and drying at room temperature to produce the biomass/iron-based organic framework composite;
   (b) adding the biomass/iron-based organic framework composite to phosphate-containing water; and
   (c) adsorbing phosphate pollutants from the water onto the biomass/iron-based organic framework composite, thereby removing the phosphate pollutants from the water; wherein
   in step 1), a g/g/mL ratio of the chitosan, the iron-based organic framework MIL-88 (B), and the crosslinking agent is 0.6:1:0.154;
   the crosslinking agent is epichlorohydrin; and
   in the first mixed solution, a g/g/mL/mL ratio of the sodium hydroxide, the sodium sulfate, the absolute ethanol, and the water is 16:12:2:300.

2. The method according to claim 1, wherein during step (c), adsorbing phosphate pollutants from the water comprises shaking at room temperature.

3. The method according to claim 2, wherein the shaking at room temperature lasts for 24 h, and a concentration of the phosphates in the phosphate-containing water is 0.2 mg/L to 1.0 mg/L.

4. The method according to claim 3, wherein the biomass/iron-based organic framework composite having absorbed the phosphates is fully shaken in 100 mL of a second mixed solution at 150 r/min to allow elution for 12 h, and then reused for adsorption of the phosphates; and the second mixed solution comprises 0.1 mol/L sodium hydroxide and 5 mol/L sodium nitrate.

* * * * *